United States Patent Office 3,598,643
Patented Aug. 10, 1971

3,598,643
METHOD OF MAKING A SINTERED CADMIUM-CONTAINING PHOTOCONDUCTOR
Harvey A. Hodes, Eatontown, N.J., James Sobieski, St. Paul, Minn., and Michael C. Zerner, Uppsala, Sweden, assignors to the United States of America as represented by the Secretary of the Army
No Drawing. Filed Feb. 24, 1970, Ser. No. 13,775
Int. Cl. G03g 5/02; C09d 5/24; H01i 13/00
U.S. Cl. 117—201
8 Claims

ABSTRACT OF THE DISCLOSURE

A sintered photoconductor is made by first mixing a photoconductive powder such as cadmium sulfide, cadmium selenide, or cadmium sulfoselenide with about 10 percent by weight of the photoconductive powder of cadmium chloride powder. The mix is added to an amount of glycerine about one quarter to about one half times by weight of the photoconductive powder. The resulting mixture is vigorously stirred for about forty-five minutes at a temperature of about 100° C. to 125° C. to form a slurry. The slurry is then coated onto a suitable substrate using a doctor blade to obtain a smooth layer. The slurry coated substrate is then placed on a hot plate at a temperature from about 200° C. to about 250° C. until all of the glycerine has been removed. The coated substrate is then placed in an oven that has been previously heated to about 250° C. The oven temperature is then raised to about 500° C. to 550° C. while a flow of nitrogen is maintained during a sintering cycle of about 20 to 25 minutes.

The invention described herein may be manufactured, used and licensed by or for the Government for governmental purposes without the payment to us of any royalty thereon.

This invention relates to the art of making sintered photoconductors. The sintered photoconductors made by the invention method are suitable for use in photoelectrolytic imaging devices as disclosed and claimed in the U.S. patent applications of Hodes and Zerner for Photoelectric Imaging Device, Ser. Nos. 670,815 and 670,816 filed Sept. 26, 1967, both now abandoned and assigned to the same assignee.

BACKGROUND OF THE INVENTION

Heretofore, sintered photoconductors have been made by mixing active photoconductive materials as for example, a mixture of cadmium sulfide and a suitable flux, such as cadmium chloride with either water or glycerine. Where water is the solvent, sufficient water is added to form a uniform slurry which is then spread over a suitable substrate material, dried and fired. Where glycerine is the solvent, the active photoconductive material is first ground with the cadmium chloride flux in a mortar and pestle at room temperature with sufficient glycerine to form a thick paste, which is then screened onto a substrate. The glycerine is then removed by heating, and the coated substrate fired in an oven.

The water based method has several disadvantages. That is, the weight of photoconductive powder is so high with respect to the specific gravity of water, that no matter how carefully the slurry is made, there is uneven settling of the photoconductive powder and, quite often, spotty patches of cadmium chloride are left behind as the water evaporates. This renders the resulting coated substrate unusable in a photoelectrolytic imaging system since the resulting surface is too rough and uneven for picture taking. Another disadvantage of the water based system is the tendency of the resulting photoconductive layer to develop surface cracks on sintering. Still another disadvantage of the water based system is the impossibility of making photoconductive layers, particularly large area photoconductive layers on the order of 3 inches by 4 inches and larger, having reproducible properties. That is, uneven settling of the photoconductive materials creates non-uniform thicknesses in the photoconductive layer causing non-uniform electrical properties over the total area of the layer.

Some of the foregoing disadvantages are remedied by turning to the use of glycerine as the solvent, but at the same time, other disadvantages are created. That is, when grinding the mix of photoconductive powder and cadmium chloride in a mortar, it is difficult to solubilize the cadmium chloride in the glycerine. If all the cadmium chloride is not in solution, the photoconductive layer will have uneven electrical properties, often shorting out when a bias is applied, and too high a dark current. Moreover, sintered photoconductors using glycerine as the solvent are characterized by large porous structures unsuitable for photoelectrolytic imaging purposes.

SUMMARY OF THE INVENTION AND DESCRIPTION OF THE PREFERRED EMBODIMENT

The general object of this invention is to provide a method of making a sintered photoconductor. A further object of this invention is to provide such a method wherein the photoconductor formed will be characterized by superior resolution capabilities, by reproducible electrical characteristics, and by suitability for use in photoelectrolytic imaging devices. A still further object of the invention is to provide such a method wherein wide control can be obtained over the porosity of the sintered layer, wherein photoconductors of varying shapes can be obtained, and wherein the resulting photoconductor will be free from surface imperfections and irregularities.

A sintered photoconductor is made according to the invention as follows:

5 grams of either cadmium sulfide powder, cadmium selenide powder, or cadmium sulfoselenide powder is mixed with 0.5 gram of cadmium chloride powder. The mix is added to 2.5 grams of glycerine and the resulting mixture vigorously stirred, using a high speed stirrer, for about 45 minutes at about 100° C. to 125° C. to form a slurry. The slurry is then poured onto an electrically conductive substrate such as Nesa glass and doctor bladed to obtain a smooth layer. The slurry coated substrate is then placed on a hot plate at a temperature from about 200° C. to 250° C. until all of the glycerine has been removed. Then the coated substrate is placed in an oven that has been previously heated to about 250° C. The oven temperature is then raised to about 500° C. to 550° C. while a flow of nitrogen is maintained during a sintering cycle of about 20 to 25 minutes.

The resulting sintered photoconductive layer in all instances is smooth and free from surface imperfections. The sintered layer itself is about 10 mils in thickness; the layer not varying in thickness at any point by more than 0.10 mil. Moreover, the sintered photoconductor exhibits greatly enhanced photographic resolution because of its uniformly small pore sizes. It also exhibits a uniform electrical response over the entire photoconductive layer because of more intimate mixing of cadmium chloride-photoconductive powders, resulting in uniform sintering.

The use of elevated temperatures in the method of mixing controls the viscosity and the liquidity of the glycerine and accelerates and insures the complete solubility of cadmium chloride in the minimum amount of glycerine needed to form a given layer. This is very important since the less the glycerine required, the smaller the resultant pore size and the denser the photoconductive layer.

The method also eliminates the need for prior art type screening techniques.

A further desirable extension of the method of this invention is to waterproof the resulting sintered photoconductive layer in such a manner that no loss occurs in the photoconductivity of the sintered layer. That is, the photoconductive properties of the sintered layer are adversely affected by water, or atmospheric moisture. Since a wet junction is required in photoelectrolytic imaging devices between the sintered photoconductive layer and the image forming layer, when the sintered photoconductor prepared by the method of this invention is to be used in such a photoelectrolytic imaging device, an additional waterproofing step must be included. This can be accomplished by applying a solution of silicone resin in toluene to the surface of the photoconductive layer.

Photomicrographs of the sintered photoconductors made according to the method of this invention show the sintered layer to be characterized by closer packing, higher density, and finer particle sizes of photoconductor than sintered layers made according to the prior art methods described above. It is believed that these factors are responsible for the high resolution capability of the sintered layer. For example, a resolution of 12 lines per millimeter is obtained with the sintered photoconductor made according to this invention, as compared with 4 lines per millimeter for the sintered layers made by prior art methods.

A desirable property in photoelectrolytic imaging devices is the amplification of the primary light image into useful electrical energy. This ratio of electrons produced per photon absorbed is commonly called "quantum gain." The sintered photoconductive layers produced by carrying out the method of this invention are characterized by superior quantum gain. That is, when the sintered photoconductive layer is assembled into a photoelectrolytic imaging device such as described and claimed in Ser. Nos. 670,815 and 670,816, and the device exposed in image-wise fashion, the primary photon energy impinging on the device is amplified many thousands of times into useful electrical energy. Quantum gains as high as $10^4$ are obtained when the sintered photoconductive layer is prepared by the method of this invention.

Sintered photoconductors made by the method of this invention besides being used in photoelectrolytic imaging devices, can also be used in other applications requiring large surface area, uniform electrical properties, high quantum gain, and high image resolution such as low light level image intensifier panels.

We wish it to be understood that we do not desire to be limited to the exact details described, for obvious modifications will occur to a person skilled in the art.

What is claimed is:

1. Method of making a sintered photoconductor including the steps of
   (A) mixing a photoconductive powder selected from the group consisting of cadmium sulfide, cadmium selenide, and cadmium sulfoselenide with about 10 percent by weight of the photoconductive powder of cadmium chloride powder,
   (B) adding the mix to an amount of glycerine about one quarter to about one half times by weight of the photoconductive powder,
   (C) vigorously stirring the resulting mixture for about 45 minutes at a temperature of about 100° C. to 125° C. to form a slurry,
   (D) coating the slurry onto a suitable substrate and using a doctor blade to obtain a smooth layer,
   (E) placing the slurry coated substrate on a hot plate at a temperature from about 200° C. to 250° C. until all of the glycerine has been removed,
   (F) placing the coated substrate in an oven that has been previously heated to about 250° C., and
   (G) raising the oven temperature to about 500° C. to 550° C. while a flow of nitrogen is maintained during a sintering cycle of about 20 to 25 minutes.

2. Method according to claim 1 wherein the photoconductive powder is cadmium sulfide.

3. Method according to claim 1 wherein the photoconductive powder is cadmium selenide.

4. Method according to claim 1 wherein the photoconductive powder is cadmium sulfoselenide.

5. Method according to claim 1 wherein the sintered photoconductor is waterproofed by applying a solution of silicone resin in toluene to the surface of the photoconductive layer.

6. Method according to claim 2 wherein the sintered cadmium sulfide photoconductor is waterproofed by applying a solution of silicone resin in toluene to the surface of the photoconductive layer.

7. Method according to claim 3 wherein the sintered cadmium selenide photoconductor is waterproofed by applying a solution of silicone resin in toluene to the surface of the photoconductive layer.

8. Method according to claim 4 wherein the sintered cadmium sulfoselenide photoconductor is waterproofed by applying a solution of silicone resin in toluene to the surface of the photoconductive layer.

References Cited
UNITED STATES PATENTS

| | | | |
|---|---|---|---|
| 2,879,182 | 3/1959 | Pakswer et al. | 117—201 |
| 3,142,586 | 7/1964 | Colman | 117—215 |
| 3,379,527 | 4/1968 | Corrsen et al. | 96—1.5 |

CHARLES E. VAN HORN, Primary Examiner

J. C. COOPER III, Assistant Examiner

U.S. Cl. X.R.

117—218, 34, 46; 96—1.5; 252—501; 106—301